United States Patent
Boerstler et al.

(10) Patent No.: US 6,515,530 B1
(45) Date of Patent: Feb. 4, 2003

(54) DYNAMICALLY SCALABLE LOW VOLTAGE CLOCK GENERATION SYSTEM

(75) Inventors: David W. Boerstler, Round Rock, TX (US); Gary D. Carpenter, Pflugerville, TX (US); Hung C. Ngo, Austin, TX (US); Kevin J. Nowka, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/974,985

(22) Filed: Oct. 11, 2001

(51) Int. Cl.[7] ................................................. G06F 1/04
(52) U.S. Cl. ...................................................... 327/291
(58) Field of Search ................................ 327/115, 117, 327/155, 156, 157, 158, 159, 291, 292, 293, 294, 298

(56) References Cited

U.S. PATENT DOCUMENTS 6,031,429 A * 2/2000 Shen ........................... 327/156
6,066,990 A * 5/2000 Genest ........................ 327/115
6,298,448 B1 10/2001 Shaffer et al. .............. 713/322

* cited by examiner

*Primary Examiner*—Jeffrey Zweizig
(74) *Attorney, Agent, or Firm*—Richard F. Frankeny; Winstead Sechrest & Minick, P.C.; Casimer K. Salys

(57) ABSTRACT

A phase locked loop (PLL) circuit uses a programmable frequency divider (PRFD) to generate a feedback clock from the PLL output clock. The PLL power supply voltage and a PLL reference current are generated by regulating the scalable logic supply voltage of the system in using regulator circuits. The PLL power supply voltage is regulated to a level lower than the lowest level of the scalable logic supply voltage used by the system. The PLL generates a PLL output clock whose frequency is higher than the highest frequency of operation of the system using the highest level of the scalable logic power supply voltage. The PLL output clock is divided is a second PRFD to generate a divided PLL clock. The PLL clock and a fixed auxiliary clock are selected in a glitch-free multiplexer (MUX) as the system clock for the system. The system clock frequency may be dynamically scaled by programming the divisor in the second PRFD dividing the PLL clock. If any of the scaling dynamics may affect the system clock, then the fixed frequency clock may be selected as the system clock until any transients have stabilized. The MUX may also stop the system in a known logic state. The PLL may also be optimized while the system is running.

26 Claims, 6 Drawing Sheets

DYNAMICALLY SCALABLE LOW VOLTAGE CLOCK GENERATION SYSTEM

CROSS REFERENCE TO RELATED APPLICATION

The present invention is related to the following U.S. Patent Applications which are incorporated by reference:

Ser. No. 09/974,990 entitled "Glitchless Clock Selector" filed concurrently herewith, Ser. No. 09/974,969 entitled "Multi-mode VCO" filed concurrently herewith, Ser. No. 09/974,987 entitled "Clock Divider With Bypass" filed concurrently herewith, Ser. No. 09/975,187 entitled "Dual-mode Charge Pump" filed concurrently herewith, and Ser. No. 09/631,718 entitled "Apparatus and Method for High Resolution Frequency Adjustment in a Multistage Frequency Synthesizer" filed Aug. 3, 2000.

TECHNICAL FIELD

The present invention relates in general to circuits for generating and controlling computer clocks.

BACKGROUND INFORMATION

Phase lock loops (PLL's) have been widely used in high-speed communication systems because PLL's efficiently perform clock recovery or clock generation at a relatively low cost. Dynamic voltage and frequency scaling is a critical capability in reducing power consumption of power sensitive devices. Scaling, in this sense, means the ability to select a high performance with nominal power supply voltages and high frequency clock operation, or a lower performance by reducing the power supply voltage and corresponding the clock frequency. Reducing the system power is usually done when performance is not needed or when running from a limited energy source such as a battery. To allow low power operation, the PLL and other circuits support very aggressive power/energy management techniques. For the PLL, this means low power operation while supporting key required features such as dynamic frequency scaling, dynamic voltage scaling, clock freezing, and alternate low frequency clocking. Dynamic scaling implies that the PLL is able to support changes in the system clock frequency and logic supply voltage without requiring the system to stop operation or wait for the PLL clock to relock on the new clock frequency.

Using a PLL has advantages in a battery powered system because a PLL is able to receive a lower frequency reference frequency from a stable oscillator to generate higher system clock frequencies. A PLL also allows changing the system clock frequency without changing the reference frequency. The prior art has described ways of selecting operating points of voltage and frequency statically, for example stopping execution while allowing the PLL to relock to a new frequency. This slows system operations and complicates system design. A delay-locked loop (DLL) may also be used to generate a high fixed frequency.

There is, therefore, a need for a clock generation system based on a PLL that allows the benefits of a PLL to be used during frequency and voltage scaling without requiring the system to halt operation. There is also a need for a clock generation system based on a PLL that allows optimization of power dissipation by allowing the PLL to operate at the highest frequency possible at a set system logic power supply voltage.

SUMMARY OF THE INVENTION

A phase locked loop (PLL) has a programmable frequency divider (PRFD) that divides the output of the PLL to generate a feedback clock (FBCLK) which is compared to a reference clock (RCLK) in a phase/frequency comparator. The PLL output is divided in a second PRFD to generate a divided PLL output clock. The PLL is powered from a scalable logic power supply voltage of a system that employs dynamic frequency and voltage scaling to manage energy consumption of the system. The PLL power supply and reference voltages are generated by voltage regulating the scalable logic power supply voltage. The PLL supply voltage is less than the lowest voltage level of the scalable logic power supply voltage used in the system. The PLL is designed to operate at the highest frequency of the system when the system uses the highest level of the scalable logic power supply voltage. A fixed frequency clock and the PLL output clock are multiplexed (MUX) in a glitch-less circuit under system control to supply the system clock. The scalable logic power supply voltage may be varied without affecting operation of the PLL. If the scalable logic power supply voltage level is to be lowered below a level that supports the existing system clock frequency, then the system clock frequency is first lowered by programming the frequency divider that divides the PLL output. The divisor of the second PRFD may be dynamically changed without switching to the fixed frequency clock. A valid signal from the second PRFD is generated indicating when its divisor may be changed without causing glitches in its output. If the frequency of the PLL is to be altered, then the MUX selects the fixed frequency clock as the system clock, then programs the PLL and waits for it to stabilize, then the PLL output clock is again switched back as the system clock. The system clock signal is stopped, if necessary, in a known logic state by an appropriate signal sent to circuits in the MUX selecting the system clock signal. The logic employed in stopping and starting the system clock signal use a clock separate from the system clock signal. The scalable logic power supply voltage and the system clock frequency are dynamically scaled to manage system energy consumption and to optimize performance at a given energy consumption level. In one embodiment the scalable logic power supply voltage may be supplied by a battery whose voltage may change due to battery discharge. The battery voltage is monitored and the system clock frequency is dynamically scaled when necessary without affecting the PLL.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
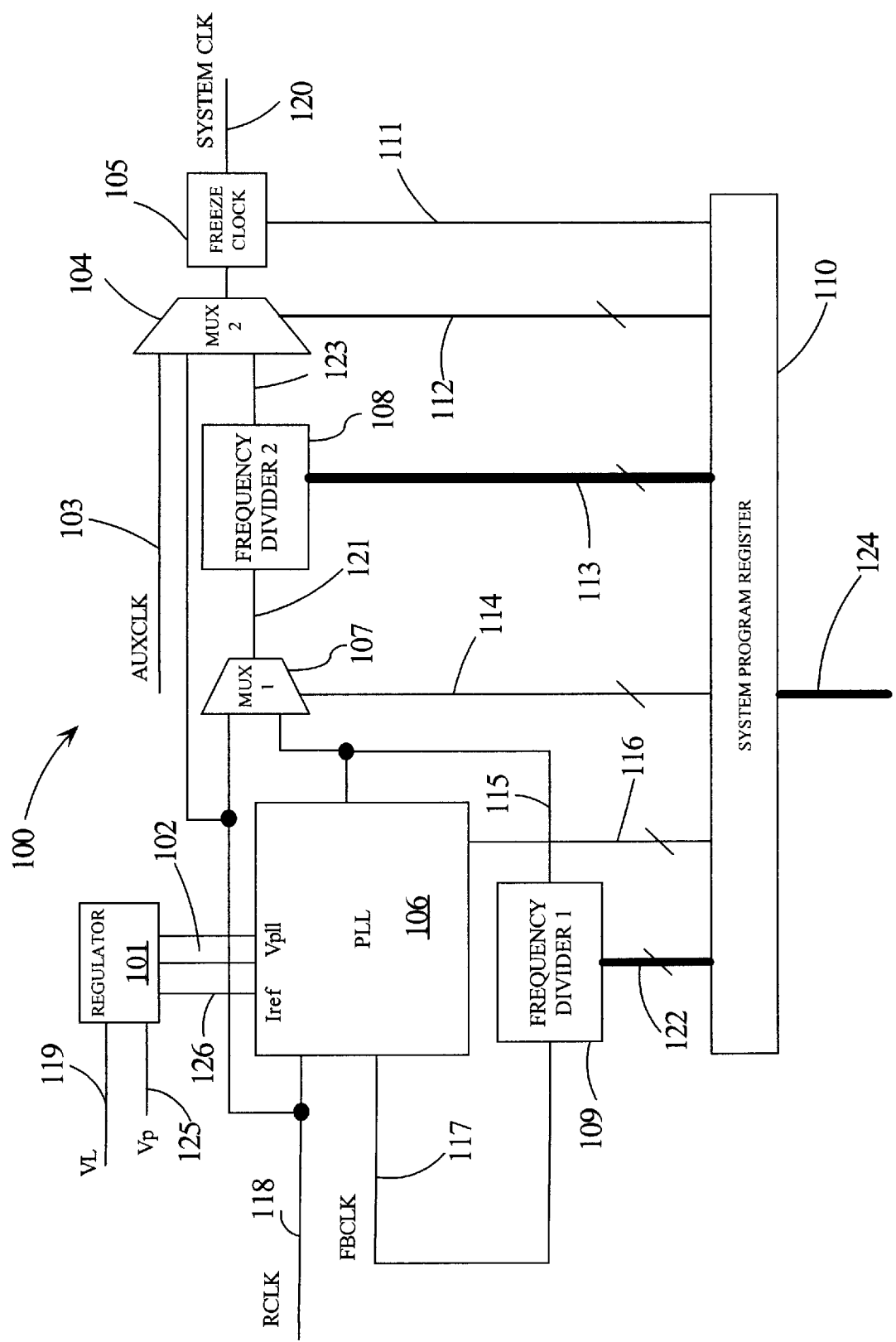
FIG. 1 is a block diagram of a clock generation system according to one embodiment of the present invention.

In the following description, numerous specific details are set forth to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted in as much as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views. In the following detailed descriptions, a logic zero is a low or zero voltage and a logic one is a high or a plus supply voltage to simplify explanation of embodiments of the present invention.

FIG. 1 is a block diagram of the clock generation system 100 according to embodiments of the present invention. Phase lock loop (PLL) 106 receives a reference clock (RCLK) signal 118, feedback clock (FBCLK) signal 117 and generates a PLL output signal 115. Programmable frequency divider (PRFD) 109 divides the PLL output 115 to generate FBCLK 117. RCLK 118 is a lower frequency than the frequency of PLL output 115. PRFD 109 is programmable by control signals 122 of system program register PR 110 which may be changed under software control through bus 124. Programming PRFD 109 allows the system to set the frequency of PLL output 115. In this embodiment of the present invention, the PLL output 115 is multiplexed with RCLK 118 in multiplexer (MUX) 107 to allow either a higher frequency PLL output 115 or RCLK 118 to be presented as the input to a second PRFD 108. This allows frequency scaling if a failure occurs in PLL 106. If PLL 106 is not operable then control signals 114 are used to switch to RCLK 118 as output 121 of MUX 107 as the input to PRFD 108. Even though RCLK 118 may be a lower than desired frequency, output 123 may nevertheless be frequency scaled by programming PRFD 108.

PRFD 108 has separate control signals 113 from PREG 110 which allow PLL output 115 or RCLK 118 to be further frequency divided. PRFD 108 is a programmable frequency divider with the feature that allows its divisor to be dynamically changed without causing glitches on its output. PRFD 108 receives a valid signal in control signals 113 that indicates to PR 110 when the divisor may be changed and not cause a glitch on output 123. PRFD 108 has circuits that look at present divisor value and then determines first which valid divisor values it will accept from PREG 110 and then once a valid divisor is received when to set the divisor value into its circuits to allow no glitches on its output.

PRFD 108 output 123, RCLK 118, and AUXCLK 103 maybe selected in MUX 104 as the input to FREEZE CLOCK circuit 105 which passes the selected clock to SYSTEM CLOCK 120 depending on the control signals 111. While all of these options allow a wide variation for SYSTEM CLOCK 120, a key to optimizing the system operation for power management in an energy sensitive system is scaling the voltage and operating frequency of the SYSTEM CLOCK 120 while maintaining optimum operation for a given set point. Likewise, a key to managing the operation of the PLL based clock generation system 100 of the present invention is the voltage regulator 101. The power supply voltage (Vpll 102) and reference current (Iref 126), needed for operation of PLL 106, are derived from the scalable logic power supply (SLPS) voltage (VL 119). If system power is being conserved, VL 119 may be reduced. By using voltage VL 119 as the head voltage for the regulator 101, PLL supply voltage (Vpll) 102 is maintained at its optimum level while VL 119 is reduced thereby lowering the losses in the pass regulating device of regulator 101. Voltage regulator 101 also isolates the circuits of PLL 106 from dVL/dT (time rate of change in VL 119) associated with dynamic voltage scaling. To support frequency scaling PLL 106 is operated at the highest frequency allowed for system clock 120 at a low fixed value for Vpll 102. In this way, the greatest flexibility in reducing power by lowering VL 119 is maintained. Regulator 101 may have a voltage program signal Vp 125 which may allow Vpll 102 to be modified, for example during testing. Regulator 101 may be a linear regulator or a DC to DC type converter and still be within the scope of the present invention.

VL 119 may be scaled actively by directing the supply generating VL 119 to change its output voltage level. In this case the new level of VL 119 known and appropriate frequency scaling action may be take using control signals 113 or 122. If VL 119 is the output of a battery, then the battery voltage may change due to natural battery discharge during use. In this case, voltage scaling is not active. By monitoring the battery voltage (in this case VL 119) the system may determine if the frequency of SYSTEM CLOCK 120 needs to change. Since PLL 106 operates at a substantially constant output level of Vpll 102, the output frequency of PLL output 115 is not affected when VL 119 changes due to battery voltage decay.

Under system control, the frequency of output 123 may be changed by integer values by programming PRFD 108 while leaving PLL 106 operating at a relatively constant Vpll 102 voltage and PLL output 115 frequency through the dVL/dT and dF/dT (time rate of change of system clock 120) of dynamic scaling. Software control ensures that SYSTEM CLK 120 is not operated above the maximum frequency the logic is able to support for a given set level for VL 119. While dynamic scaling does not necessarily drive multiple operating points for PLL 106, the desire for flexibility in selecting operating points means that PLL 106 should be programmable. The frequency of PLL output 115 is set by PRFD 109 using control signals 122.

To allow for very low frequency operation, PLL 106 may be bypassed to either use either RCLK 118 or AUXCLK 103 (many systems have a 32 kHz, 1 MHz, or 4 MHz signal available for other functions). In other embodiments of the present invention, the clock generation system allows the SYSTEM CLOCK 120 to be stopped completely with FREEZE CLOCK circuit 105. The various clock options for SYSTEM CLOCK 120 are selected using control signals of PREG 110. The logic supporting clock options for SYSTEM CLOCK 120 must ensure glitch-free transitions between the clock sources to ensure the system logic receives valid clock signals. SYSTEM CLOCK 120 may be "frozen" low for a few clock cycles during a clock source transition period, but SYSTEM CLOCK 120 must terminate the last high of the old clock source and generate the first new clock pulse for the new clock source that meets the minimum pulse width requirements. Also the transition to and from the AUXCLK 103 must meet this same requirement even though AUX-CLK 103 may be asynchronous to the other clock sources (e.g. RCLK 118 and PLL output 115). The logic used for the FREEZE CLOCK circuit 105 operates on a clock signal that is different from SYSTEM CLOCK 120. This ensures that the dynamics of SYSTEM CLOCK 220 do not affect the operation of FREEZE CLOCK circuit 105.

Figure 2:
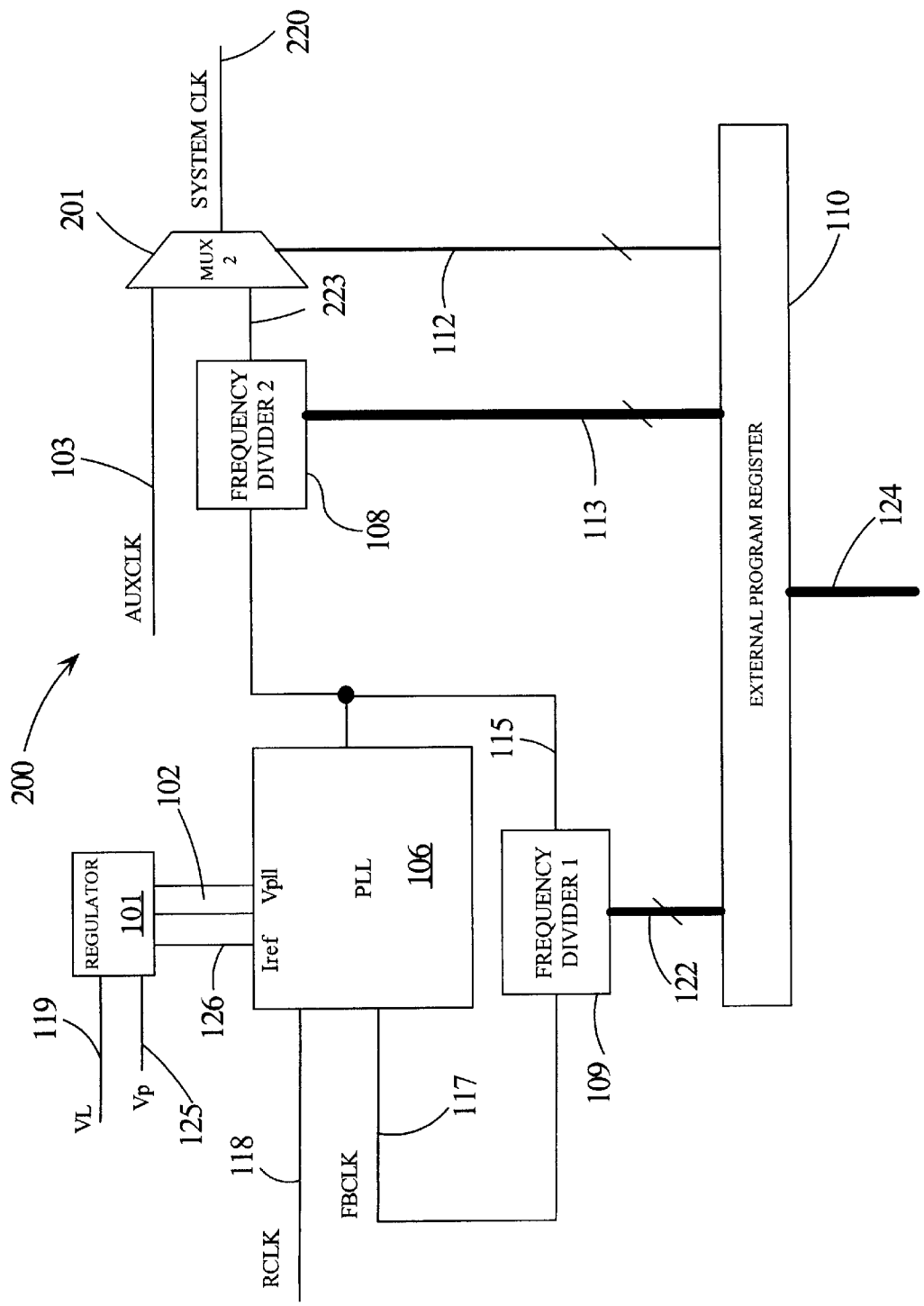
FIG. 2 is a block diagram of a clock generation system according to another embodiment of the present invention.

FIG. 2 is a block diagram of a clock generation system 200 according to another embodiment of the present invention. PLL 106 receives RCLK 118, FBCLK 117 and generates PLL output 115. PRFD 109 divides the PLL output 115 to generate FBCLK 117. In this case, RCLK 118 is a lower frequency than the frequency of PLL output 115. PRFD 109 is programmable by control signals 122 of program register PREG 110 which allows the system 200 to determine the output frequency of PLL output 115. PRFD 108 receives control signals 113 from PREG 110 which divides the frequency of PLL output 115 to generate input 223 for clock selector MUX 201. MUX 201 also receives auxiliary clock (AUXCLK) 103. This allows a SYSTEM CLOCK 220 to be selected from AUXCLK 103 or input 223 (frequency divided PLL output 115). In this embodiment, only one MUX (MUX 201) is used to select from variable clock signal 223 and fixed clock signal AUXCLK 103.

To allow for very low frequency operation, PLL 106 may be bypassed to use AUXCLK 103 (many systems have a 32 kHz, 1 MHz, or 4 MHz signal available for other functions). Another feature of the clock generation system of the present invention allows the clock to be stopped completely by circuits in MUX 201. These clock options are selected using control signals of PREG 110. The logic supporting these options must ensure glitch-free transitions between the clock sources so the system logic receives valid clock signals. The logic circuits used for stopping and starting SYSTEM CLOCK 220 operate on a clock signal that is different from SYSTEM CLOCK 220. This ensures that the dynamics of SYSTEM CLOCK 220 do not affect the operation of the logic circuits used for stopping and starting SYSTEM CLOCK 220.

MUX 201 is a selector that has the characteristics such that it does not switch immediately based on the control signals 112, rather it accepts these inputs and switches from the existing clock source to the selected source while guaranteeing glitch-free switching.

Figure 3:
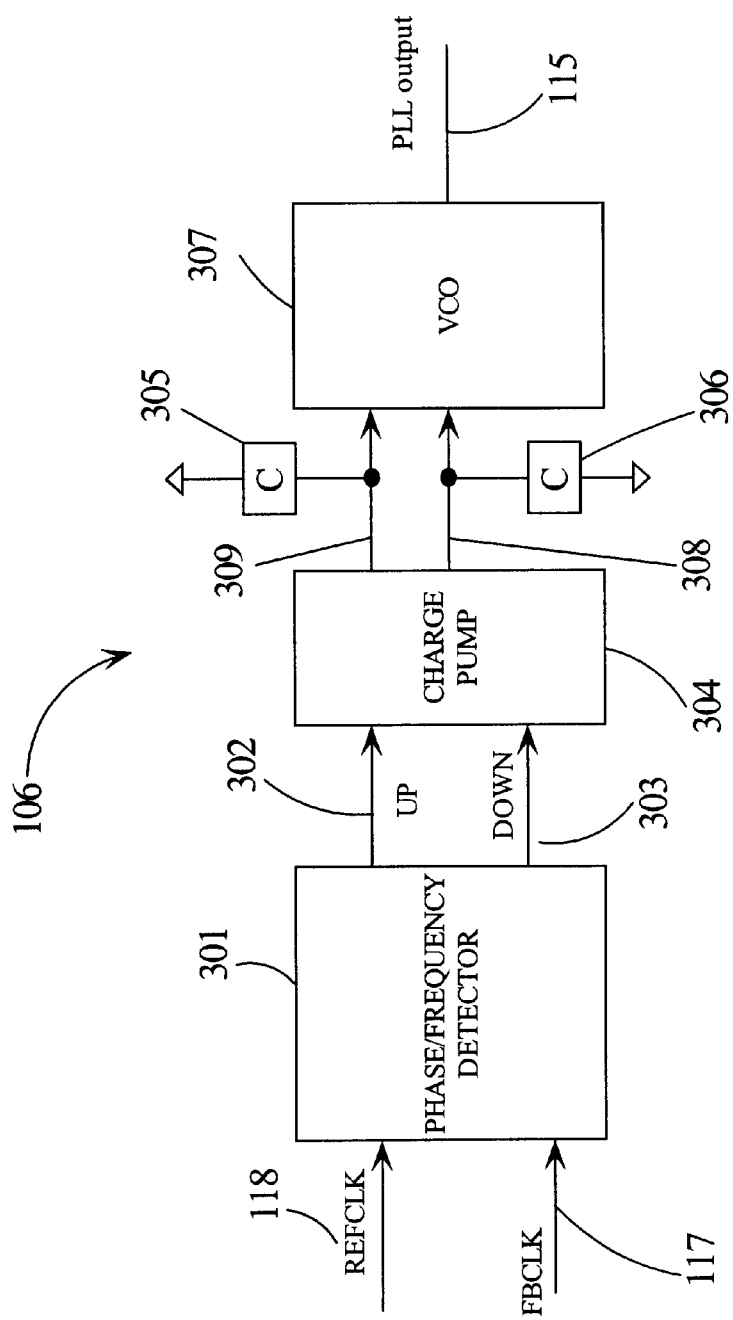
FIG. 3 is a block diagram of PLL circuits suitable to use in a clock generation system according to embodiments of the present invention.

FIG. 3 is a detailed block diagram of circuits in PLL 106 used to practice principles of the present invention. RFCLK 118 and FBCLK 117 are coupled to phase/frequency detector (PFD) 301. PFD 301 primarily measures the phase error between RFCLK 118 and FBCLK 117, however, the phase error at any one time may be the result of a combination of phase and frequency differences. Two signals, UP 302 and DOWN 303 are generated and coupled to charge pump 304 which effectively integrates the phase error signals such that a voltage level proportional to the phase error is generated as control voltages 308 and 309. Control voltages 308 and 309 may be further filtered using loop filters 305 and 306 to limit the loop bandwidth of PLL 106. Control voltages 308 and 309 are coupled to voltage-controlled oscillator (VCO) 307 to set the output frequency of PLL output 115. In FIGS. 1 and 2, PLL output 115 is shown divided in PRFD 109 to generate FBCLK 117 and thus close the feedback loop of PLL 106.

The clock generation systems detailed in FIGS. 1 and 2 are similar, however, the clock generation system of FIG. 1 provides more options in available sources for SYSTEM CLOCK 120. In either case, the clock generation systems of FIG. 1 and FIG. 2 may be used in an environment where dynamic scaling of the voltage and frequency of a computer system is desired. The clock generation system of FIG. 1 allows the PLL output 115 to be bypassed by REFCLK 118. This feature may be useful during test or in a case it is desirable to bypass PLL 106. The fact that REFCLK 118 may be selected as the input to PRFD 108 using MUX 107 still allows a frequency scaling operation.

Figure 4:
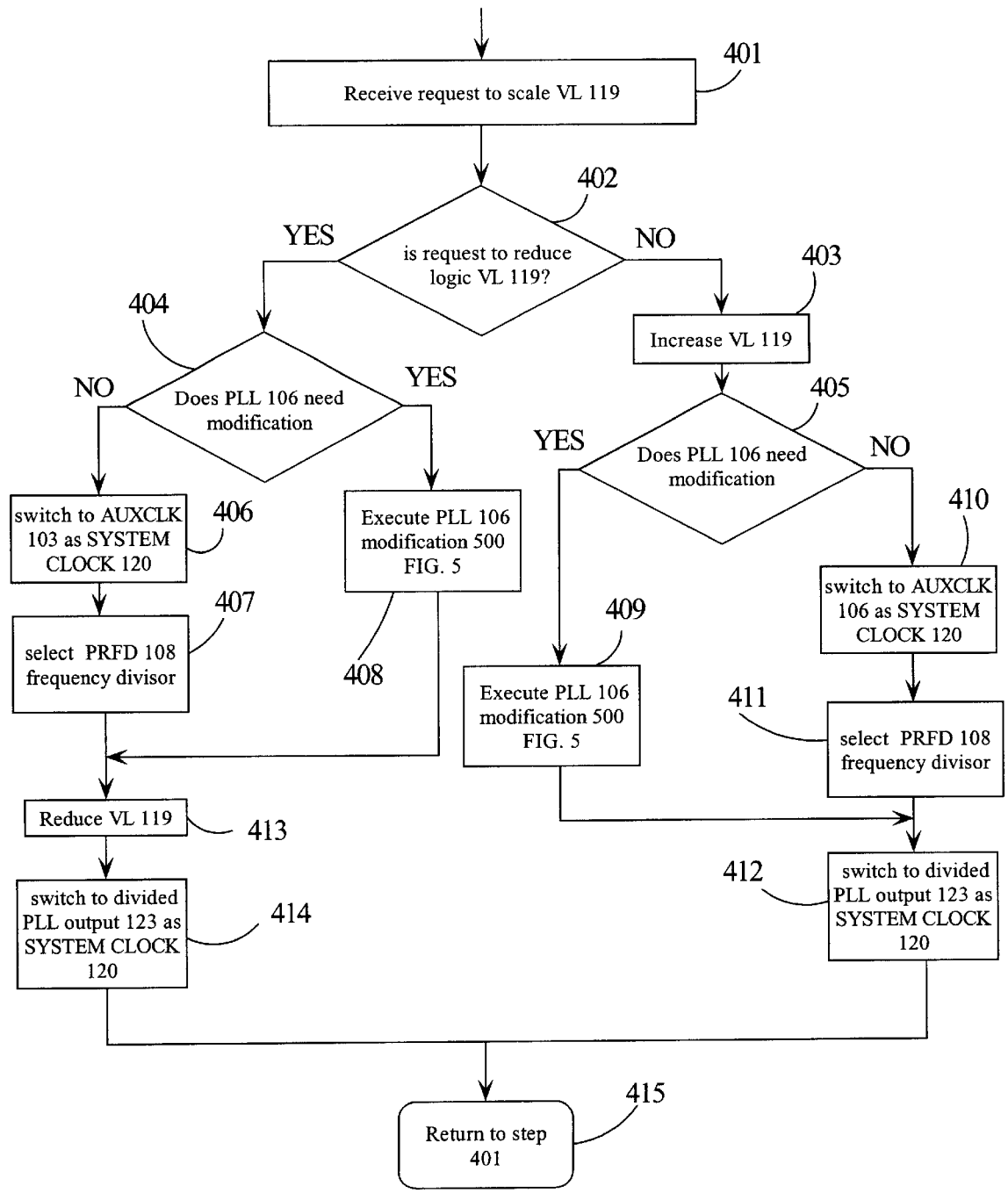
FIG. 4 is a flow diagram of method steps used in clock generation according to embodiments of the present invention.
Figure 5:
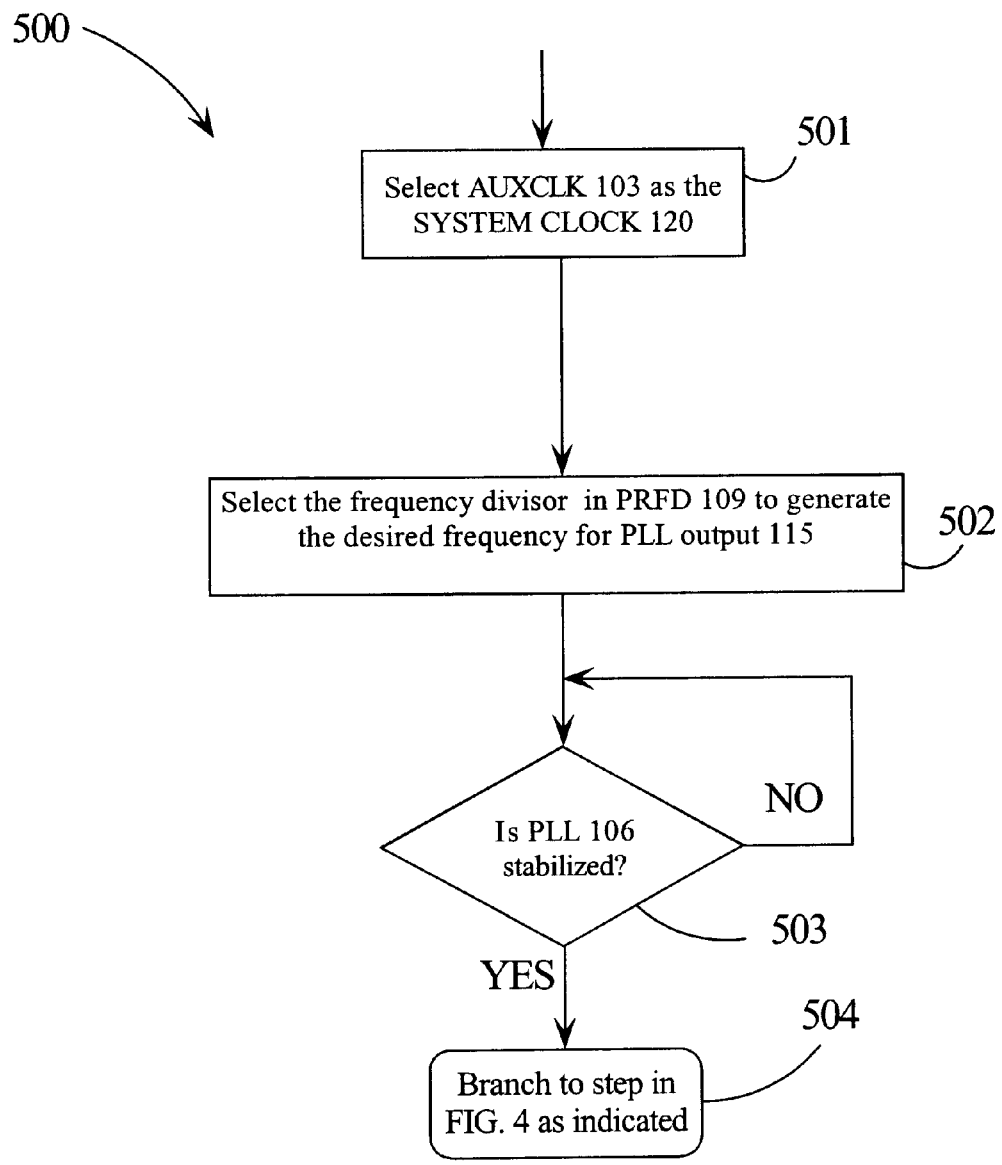
FIG. 5 is a flow diagram of method steps used to modify a PLL according to embodiments of the present invention.

The method steps in FIG. 4 and FIG. 5 combine to describe the method of clock generation for a computer system according to embodiments of the present invention. FIG. 5 is a flow diagram of method steps used when the characteristics of PLL 106 are modified to change the frequency of PLL output 115. When the frequency of PLL output 115 is modified, a delay time may be required for the circuits within PLL 106 to stabilize. During this delay time, PLL output 115 may not be suitable for use as the SYSTEM CLOCK 120 or SYSTEM CLOCK 220. The flow diagram of FIG. 4 branches to the steps in FIG. 5 whenever a step requires a change in the frequency of PLL output 115. PLL 106 is almost always operated at a fixed value for Vpll 102 so in most cases only a change in the frequency of PLL output would require the steps in FIG. 5. However, there may be cases, for example because of a test condition or diagnositics, where it is desirable to direct a new value for Vpll 102. In these cases the steps in FIG. 5 may be also be executed.

In step 501, AUXCLK 103 is first selected as the SYSTEM CLOCK 120. AUXCLK 103 is a fixed frequency clock which does not change with system dynamics. In step 502, a new frequency divisor is selected for PRFD 109 to allow generation of a new frequency for PLL output 115. This gives the PLL output 115 the widest operating range when it is divided in PRFD 108 to generate SYSTEM CLOCK 120. In step 503, a test is done to determine if the feedback loop of PLL 106 has stabilized. PLL 106 is stabilized when its output frequency is within a pre-determined frequency band and its rate of frequency change with time is below a predetermined limit. PLL 106 may generate a lock signal to indicate that it is stabilized. If the result of the test in step 503 is NO, then a wait is executed. If the result of the test in step 504 is YES, then a branch is taken in step 504 back to a step ib FIG. 4 as indicated.

FIG. 4 is a flow diagram of methods steps used in the generation of a SYSTEM CLOCK 120 when requests for voltage and/or frequency scaling are received. Generally a request to increase the frequency of SYSTEM CLOCK 120 requires a corresponding increase the SLPS voltage VL 119. While a request to reduce the frequency of SYSTEM CLOCK 120 may enable VL 119 to be reduced to further enhance power reduction, there is generally no performance requirement that VL 119 also be reduced. For this reason the method steps in FIG. 4 begin with a request to scale VL 119. It should be understood that the initial request may be to scale either frequency or voltage. In systems with complementary metal oxide semiconductor (CMOS) circuits, the system power dissipation varies with the square of the logic voltage and linearly with the clock frequency. Embodiments of the present invention exploit this characteristic by designing PLL 106 to enable it to generate the highest possible frequency for SYSTEM CLOCK 120 at a low Vpll 102 voltage. The frequency of PLL 106 may be varied by programming PRFD 109 leaving its voltage sensitive circuits operating at a constant voltage (Vpll 102). VL 119 may now be scaled (varied) over its entire range ensuring that power dissipation and performance may be managed by programming divisor changes for PRFD 108 and PRFD 109. Regulator 101 has the highest power dissipation when the system is operated for highest performance (high voltage VL 119) and lowest power dissipation when low system performance is required.

System voltage and frequency scaling follow the steps in FIG. 4. In step 401, scaling of VL 119 is requested by the system. In step 402, a test is done to determine if VL 119 is to be decreased. If the result of the test in step 402 is YES, then in step 404 a test is done to determine if PLL 106 needs to be modified to support the decreased value of VL 119. It may result that simply dividing the frequency of PLL 115 output in PRFD 108 does not achieve the desired frequency reduction and the basic frequency of PLL output 115 may also need to be reduced. If the result of the test in step 404 is NO, then in step 407, a corresponding frequency divisor for PRFD 108 is set by control signals 113. VL 119 is then reduced in step 413 and the divided PLL output 123 is switched back as SYSTEM CLOCK 120. In step 415, a branch is taken back to step 401 awaiting a new request. If the result of the test in step 404 is YES, then PLL modification steps 500 (FIG. 5) are executed in step 408. After the steps in FIG. 5, a branch back to step 413 is taken and steps 413–415 are executed.

If the result of the test in step 402 is NO, then in step 403 VL 119 is increased. Increasing VL 119 does not require frequency scaling to occur first as was the case when VL 119 was reduced. In step 405, a test is done to determine if PLL 106 needs to be modified. If the result of the test in step 405 is YES, then PLL modification steps 500 (FIG. 5) are executed in step 409. In step 412, divided PLL output 123 is switched back as SYSTEM CLOCK 120. In step 415, a branch is taken to step 401 awaiting another scaling request. If the result of the test in step 405 is NO, then AUXCLK 103 is switched as SYSTEM CLOCK 120 in step 410. In step 411, a new divisor for PRFD 108 is set. In step 412, divided PLL output 123 is switched back as SYSTEM CLOCK 120 and in step 415 a branch is taken back to step 401 awaiting another scaling request.

Figure 6:
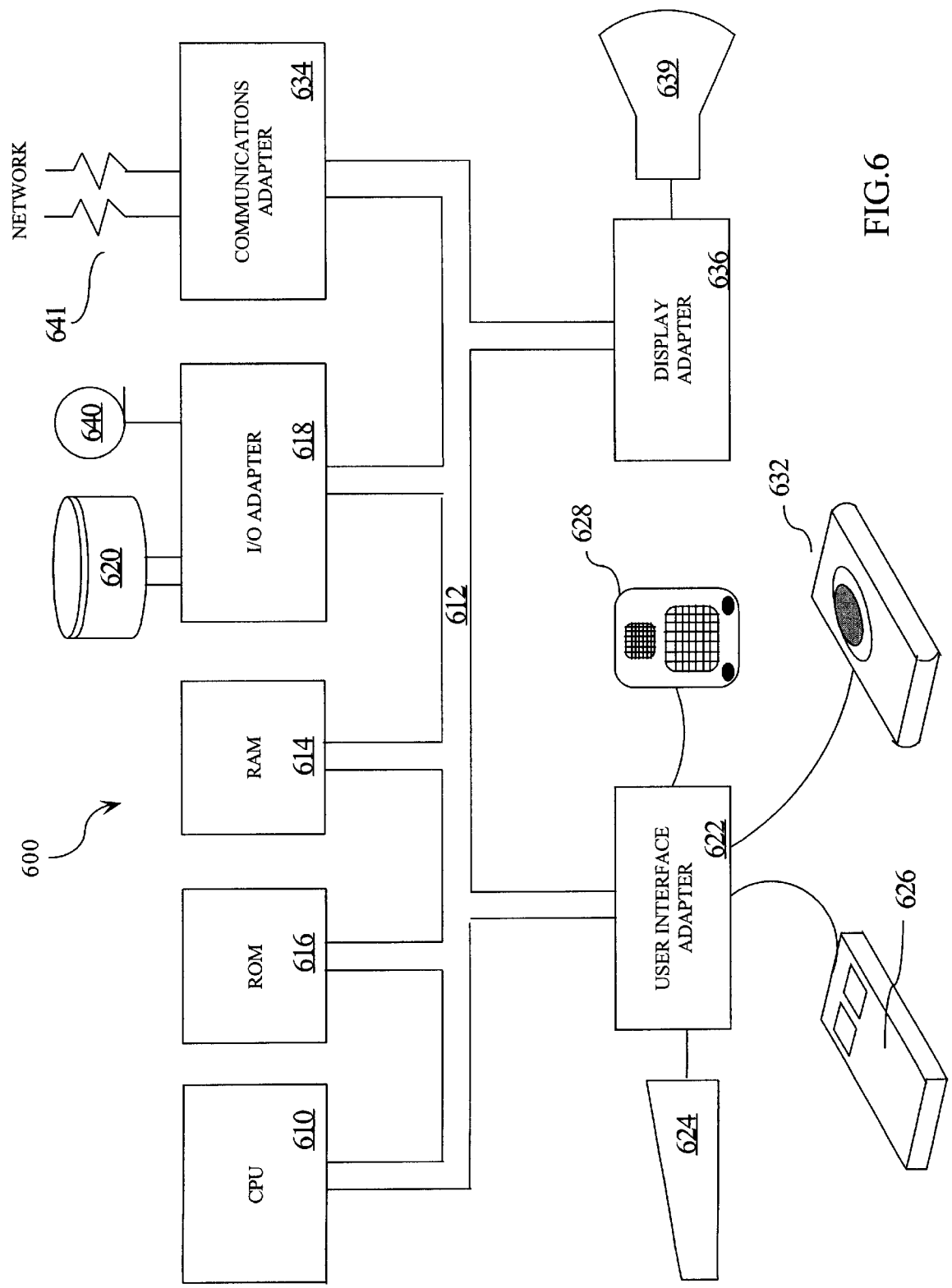
FIG. 6 is a block diagram of a data processing system suitable to use embodiments of the present invention for clock generation.

FIG. 6 is a high level functional block diagram of a representative data processing system 600 suitable for practicing the principles of the present invention. Data processing system 600, includes a central processing system (CPU) 610 operating in conjunction with a system bus 612. System bus 612 operates in accordance with a standard bus protocol, such that as the ISA protocol, compatible with CPU 610. CPU 610 operates in conjunction with random access memory (RAM) 614. RAM 614 includes, DRAM (Dynamic Random Access Memory) system memory and SRAM (Static Random Access Memory) external cache. I/O Adapter 618 allows for an interconnection between the devices on system bus 612 and external peripherals, such as mass storage devices (e.g., a hard drive, floppy drive or CD/ROM drive), or a printer 640. A peripheral device 620 is, for example, coupled to a peripheral control interface (PCI) bus, and I/O adapter 618 therefore may be a PCI bus bridge. User interface adapter 622 couples various user input devices, such as a keyboard 624, mouse 626, touch pad 632 or speaker 628 to the processing devices on bus 612. Display 639 which maybe, for example, a cathode ray tube (CRT), liquid crystal display (LCD) or similar conventional display units. Display adapter 636 may include, among other things, a conventional display controller and frame buffer memory. Data processing system 600 may be selectively coupled to a computer or telecommunications network 641 through communications adapter 634. Communications adapter 634 may include, for example, a modem for connection to a telecom network and/or hardware and software for connecting to a computer network such as a local area network (LAN) or a wide area network (WAN). CPU 610 may be operated in a mode where frequency and voltage scaling are used to manage power dissipation in system 600. To ensure that CPU 610 and other components of data processing system 600 have glitch-free clocks and the system does not have to stop during scaling, a clock generating system according to embodiments of the present invention may be used.

The present invention and its advantages have been described in detail, it should be understood that various changes, substitutions and alterations can be made herein without departing from the spirit and scope of the invention as defined by the appended claims.

What is claimed is:

1. A clock generator for a system comprising:
   a voltage regulator receiving a scalable logic power supply voltage of said system and generating a substantially constant power supply voltage, wherein said power supply voltage is a voltage level lower than a lowest voltage level of said scalable logic power supply voltage used for said system;
   a phase lock loop circuit, powered by said power supply voltage, receiving a reference clock signal, a feedback clock signal and generating a phase lock loop output signal, said feedback clock signal generated by frequency dividing said phase lock loop output signal; and
   a first programmable frequency divider receiving said phase lock loop output signal, first control signals and generating a frequency scalable clock signal as a system clock for said system in response to said first control signals,
   wherein a frequency of said phase lock loop output signal is greater than or equal to a maximum frequency of operation of said system corresponding to a highest voltage level of said scalable logic power supply voltage.

2. The clock generator of claim 1, further comprising:
   a multiplexer receiving said frequency scalable clock signal, an auxiliary clock signal, second control signals and generating said system clock signal in response to said second control signals.

3. The clock generator of claim 1, wherein said scalable logic supply voltage is a battery voltage and said scalable logic supply voltage changes as the result of natural discharge when using said battery.

4. The clock generator of claim 1, wherein said voltage regulator comprises:
   a linear voltage regulator with a transistor as a pass element.

5. The clock generator of claim 1, wherein said voltage regulator comprises:
   a direct current (DC) to DC converter regulator.

6. The clock generator of claim 1, wherein a divisor of said first programmable frequency divider is changed dynamically by said first control signals without first switching to said auxiliary clock signal, said first programmable frequency divider generating a valid signal indicating when said first control signals may change states.

7. The clock generator of claim 1, wherein said phase lock loop circuit comprises:
   a second programmable frequency divider circuit receiving said phase lock loop output signal, third control signals, and generating said feedback clock signal in response to said third control signals.

8. The clock generator of claim 1 further comprising a freeze clock circuit receiving said system clock signal and fourth control signals, wherein said freeze clock circuit passes, stops, and starts said system clock signal without glitches in response to said fourth control signals.

9. The clock generator of claim 2, wherein said multiplexer switches glitch-free between said frequency scalable clock signal and said auxiliary clock signal in response to said second control signals.

10. The clock generator of claim 1, wherein said first programmable frequency divider receives an multiplexer output of a second multiplexer selecting between said reference clock signal and said phase lock loop in response to fifth control signals.

11. The clock generator of claim 7, wherein said auxiliary clock signal is selected as said system clock signal when said third control signals change signal states.

12. A method for generating a system clock signal for a system employing dynamic voltage and frequency scaling comprising the steps of:

generating a substantially constant power supply voltage by regulating a scalable logic power supply voltage of said system in a voltage regulator circuit, wherein said power supply voltage is a voltage level lower than a lowest voltage level of said scalable logic power supply voltage used for said system;

receiving a reference clock signal in a first clock circuit powered by said power supply voltage and generating a first clock signal synchronous with said reference clock signal, wherein a frequency of said first clock signal is higher than a frequency of said reference clock signal; and dividing said first clock signal in a programmable frequency divider generating a frequency scalable clock signal as said system clock signal, a divisor of said programmable frequency divider programmed by first control signals, wherein a frequency of said phase lock loop output signal is greater than or equal to a maximum frequency of operation of said system corresponding to a highest voltage level of said scalable logic power supply voltage.

13. The method of claim 12 further comprising the steps of:

receiving said frequency scalable clock signal, an auxiliary clock signal, and second control signals in a clock selector circuit; and selecting said system clock signal from between said frequency scalable clock signal and said auxiliary clock signal in response to said second control signals.

14. The method of claim 13 further comprising the steps of:

selecting said auxiliary clock signal as said system clock signal;

modifying said frequency of said first clock signal in said first clock circuit by first control signals; and selecting said frequency scalable clock signal as said system clock signal.

15. The method of claim 12 further comprising the steps of:

generating a current reference signal in said voltage regulator; and using said current reference signal in said first clock circuit when generating said first clock signal.

16. The method of claim 12, wherein said auxiliary clock signal is asynchronous with said reference clock signal and said first clock signal.

17. A clock generator for a system employing clock frequency scaling and power supply voltage scaling comprising:

circuitry for generating a substantially constant power supply voltage by regulating a scalable logic power supply voltage of said system, wherein said power supply voltage is a voltage level lower than a lowest voltage level of said scalable logic power supply voltage used for said system;

circuitry for generating a first clock signal synchronous with a reference clock signal, said circuitry for generating said first clock signal powered by said power supply voltage, wherein a frequency of said first clock signal is set by first control signals;

circuitry for dividing said first clock signal in response to second control signals generating a frequency scalable clock signal; and circuitry for selecting said system clock signal from said frequency scalable clock signal and an auxiliary clock signal in response to said third control signals, wherein a frequency of said phase lock loop output signal is greater than or equal to a maximum frequency of operation of said system corresponding to a highest voltage level of said scalable logic power supply voltage, and wherein said system clock signal is selected glitch-free and said auxiliary clock signal is selected as said system clock signal before said scalable logic power supply voltage or said frequency of said first clock signal are modified.

18. A data processing system comprising:

a central processing unit (CPU), operable with a scalable logic power supply voltage and a frequency scalable clock signal, having circuitry for generating a substantially constant power supply voltage by regulating a scalable logic power supply voltage of said system, wherein said power supply voltage is a voltage level lower than a lowest voltage level of said scalable logic power supply voltage used for said system, circuitry for generating a first clock signal synchronous with a reference clock signal, said circuitry for generating said first clock signal powered by said power supply voltage, wherein a frequency of said first clock signal is set in response to first control signals, circuitry for dividing said first clock signal in response to second control signals generating said frequency scalable clock signal, and circuitry for selecting said system clock signal from said frequency scalable clock signal and an auxiliary clock signal in response to third control signals, wherein a frequency of said phase lock loop output signal is greater than or equal to a maximum frequency of operation of said system corresponding to a highest voltage level of said scalable logic power supply voltage, and wherein said system clock signal is selected glitch-free and said auxiliary clock signal is selected as said system clock signal before said scalable logic power supply voltage or said frequency of said first clock signal are modified;

a random access memory (RAM);

a read only memory (ROM);

a communications adapter coupled to a communication network;

an I/O adapter; and a bus system coupling said CPU to said ROM, said communications adapter, said I/O adapter, and said RAM.

19. A clock generator for a system comprising:

a voltage regulator receiving a scalable logic power supply voltage of said system and generating a substantially constant power supply voltage, wherein said power supply voltage is a voltage level lower than a lowest level of said scalable logic power supply voltage used for said system;

a delay lock loop circuit, powered by said power supply voltage, receiving a reference clock signal, a feedback clock signal and generating a delay lock loop output signal; and a first programmable frequency divider receiving said delay lock loop output signal, first control signals and generating a frequency scalable clock signal as a system clock for said system in response to said first control signals, wherein a frequency of said phase lock loop output signal is greater than or equal to a maximum frequency of operation of said system corresponding to a highest voltage level of said scalable logic power supply voltage.

20. The clock generator of claim 19, further comprising:

a multiplexer receiving said frequency scalable clock signal, an auxiliary clock signal, second control signals and generating said system clock signal in response to said second control signals.

21. The clock generator of claim 19, wherein said scalable logic supply voltage is a battery voltage and said scalable logic supply voltage changes as the result of natural discharge when using said battery.

22. The clock generator of claim 19, wherein said voltage regulator comprises:

a linear voltage regulator with a transistor as a pass element.

23. The clock generator of claim 19, wherein said voltage regulator comprises:

a direct current (DC) to DC converter regulator.

24. The clock generator of claim 19, wherein a divisor of said first programmable frequency divider is changed dynamically by said first control signals without first switching to said auxiliary clock signal, said first programmable frequency divider generating a valid signal indicating when said first control signals may change states.

25. The clock generator of claim 19 further comprising a freeze clock circuit receiving said system clock signal and fourth control signals, wherein said freeze clock circuit passes, stops, and starts said system clock signal without glitches in response to said fourth control signals.

26. The clock generator of claim 19, wherein said multiplexer switches glitch-free between said frequency scalable clock signal and said auxiliary clock signal in response to said second control signals.

* * * * *